UNITED STATES PATENT OFFICE.

EDWARD MARK SLOCUM, OF MEDAN, SUMATRA, DUTCH EAST INDIES, ASSIGNOR TO GENERAL RUBBER COMPANY, A CORPORATION OF NEW JERSEY.

PROCESS FOR TREATING LATEX AND PRODUCTS OBTAINED THEREBY.

1,268,639.     Specification of Letters Patent.     Patented June 4, 1918.

No Drawing.     Application filed February 23, 1917. Serial No. 150,357.

*To all whom it may concern:*

Be it known that I, EDWARD MARK SLOCUM, a citizen of the United States, residing at Medan, Province of Deli, Sumatra, Dutch East Indies, have invented certain new and useful Improvements in Processes for Treating Latex and Products Obtained Thereby, of which the following is a full, clear, and exact description.

This invention relates to processes for treating latex or similar material and to the products obtained thereby. It is more particularly directed to a process for coagulating latex and to the coagulum so obtained.

One of the objects of the invention is to provide an inexpensive process of the kind described in which the speed of coagulation may be materially increased while obviating the use of chemicals and agents foreign to rubber-producing latexes and similar materials. Another object of the invention is to provide a process of the kind described in which the speed of coagulation may be controlled and in which the formation of clots of non-uniform character throughout the mass shall be avoided. Another object of the invention is to provide a coagulum having the desirable characteristics obtainable through the use of a process of the kind described.

Briefly stated, the invention consists in subjecting a mass containing rubber or similar material preferably in the form of latex to an agent derived from a rubber-producing plant or similar organism adapted to react with the latex, causing the reaction to take place and adding a vulcanizing agent to the so-treated mass.

In carrying out the process in its preferred form, 100 parts by weight of hevea latex or similar material are mixed with approximately 4% of a suspension containing the enzym coagulase derived from the seeds, growing shoots, leaves or other parts of *Hevea Brasiliensis*. The suspension is stirred into the mass by suitable stirring devices. A reaction ensues and a firm coagulum is formed in twenty-five minutes. Prior to or during coagulation, or at any desired time before vulcanization, sulfur or other desired vulcanizing agent may be added to the mass.

The process described is a simple and inexpensive one and increases the speed of coagulation without introducing chemicals or other agents foreign to latex.

The enzym coagulase and various other substances obtained from the hevea tree naturally occur in hevea latex. Accordingly it appears that the acceleration of coagulation is due in large part to the increase in the proportion of the enzym coagulase in the latex. The speed of the reaction of coagulation may be controlled by varying the amounts of the suspension or other form in which the coagulating material is added. Where the latex contains a substance which tends to retard coagulation the enzym coagulase tends to offset this retardation. Further the danger of the production of clots of material in the latex containing an excess of acid or other foreign substance as frequently occurs with the use of the familiar artificial coagulant acetic acid is avoided. The coagulum produced according to the process mentioned while preserving the desirable characteristics of coagula prepared by artificial means is free from foreign ingredients, and presents a uniform and firm structure.

Although the process has been set forth in its preferred form in connection with effecting a change in natural rubber, such as hevea latex, it appears that changes may be also effected in related substances, such as chicle, gutta percha, or artificial rubber, such as rubber from isoprene. It appears from experiments that have been made that the employment of coagulase as above set forth, in connection with the polymerization of intermediates, such as isoprene and the like will serve to improve the quality of the rubber obtainable from such intermediates. Although the enzym has been described as employed in the form of a suspension, it is to be understood that it may be applied to the material in the form of a colloidal solution or paste or otherwise. The preferred suspension or the solution or paste may be prepared from the various parts of the hevea plant by the usual methods of obtaining enzym preparations and may be used in concentrated form or otherwise as desired.

In carrying out the process described, it will be understood, of course, that the various steps and processes set forth in certain of my copending applications—namely, Serial No. 151,163, filed Feb. 27, 1917, and Serial No. 141,288, filed Jan. 8, 1917—may be employed in conjunction therewith. For example, prior to the addition of the reacting agent, the latex or other material may be heated to insolubilize the protein therein. Further the enzym, suspension, solution, etc., may be prepared with an antiseptic, such as sodium naphthylate, and such antiseptic reagent added to the latex, or if desired the antiseptic solution and enzym solution may be added separately to the latex.

As many apparently widely different embodiments of this invention may be made without departing from the spirit thereof it is to be understood that I do not intend to limit myself to the specific embodiment herein set forth, except as indicated in the appended claims.

Having thus described my invention, what I claim and desire to protect by Letters Patent is:

1. A process for treating a mass containing rubber or similar material which comprises combining with the mass an agent derived from a rubber-producing plant or similar organism adapted to react with said mass, causing a reaction to take place between said mass and said agent and adding a vulcanizing agent to the so-treated mass.

2. A process for treating a mass containing rubber or similar material which comprises combining with the mass an enzym adapted to react with said mass, causing a reaction to take place between said mass and said enzym and adding a vulcanizing agent to the so-treated mass.

3. A process for treating latex or similar material which comprises combining with a mass of latex an agent derived from a rubber-producing plant or organism adapted to coagulate said latex and adding a vulcanizing agent to the so-treated mass.

4. A process for treating latex or similar material which comprises adding to the latex an enzym derived from a rubber-producing plant or organism adapted to react with said latex, causing a reaction to take place between said latex and said enzym and adding a vulcanizing agent to the so-treated latex.

5. A process for treating latex or similar material which comprises combining with a mass of latex an ezym adapted to coagulate said latex, coagulating said latex, and adding a vulcanizing agent to the so-treated mass.

6. A process for treating latex or similar material which comprises combining with a mass of latex an enzym derived from a rubber-producing plant, coagulating said latex, and adding a vulcanizing agent to the so-treated mass.

7. A process for treating latex or similar material which comprises adding to the latex an agent adapted to increase the proportion of natural coagulant normally present in the latex, coagulating said latex and adding a vulcanizing agent to the so-treated mass.

8. A process for treating latex or similar material which comprises adding coagulase to latex, coagulating said latex and adding a vulcanizing agent thereto.

9. A process for treating a mass containing rubber or similar material which comprises combining with the mass an agent derived from a rubber-producing plant or similar organism adapted to react with said mass, and causing a reaction to take place between said mass and said agent.

10. A process for treating a mass containing rubber or similar material which comprises combining with the mass an enzym adapted to react with said mass, and causing a reaction to take place between said mass and said enzym.

11. A process for treating latex or similar material which comprises combining with a mass of latex an agent derived from a rubber-producing plant or organism adapted to coagulate said latex and coagulating said latex.

12. A process for treating latex or similar material which comprises adding to the latex an enzym derived from a rubber-producing plant or organism adapted to react with said latex, and causing a reaction to take place between said latex and said enzym.

13. A process for treating latex or similar material which comprises combining with a mass of latex an enzym adapted to coagulate said latex, and coagulating said latex.

14. A process for treating latex or similar material which comprises combining with a mass of latex an enzym derived from a rubber-producing plant, and coagulating said latex.

15. A process for treating latex or similar material which comprises adding to the latex an agent adapted to increase the proportion of natural coagulant normally present in the latex, and coagulating said latex.

16. A process for treating latex or similar material which comprises adding coagulase to latex, and coagulating said latex.

17. A mass containing rubber or similar material derived from latex reacted upon by an agent derived from a rubber-producing plant or similar organism and combined with the mass, said agent being in excess of the normal content of a similar agent in the latex.

18. A mass containing rubber or similar material derived from latex containing an enzym reacted upon by an enzym combined with the mass in excess of the normal enzym content of the latex.

19. A mass containing rubber derived from latex coagulated by an agent derived from a rubber-producing plant or similar organism and combined with the mass, said agent being in excess of the normal content of a similar agent in the latex.

20. A mass containing rubber or similar material derived from latex containing an enzym reacted upon by an enzym derived from a rubber-producing plant or similar organism and combined with the mass in excess of the normal enzym content of the latex.

21. A mass containing rubber derived from latex coagulated by an enzym derived from a rubber-producing plant and combined with the mass, said enzym being in excess of the normal enzym content of the latex.

22. A mass containing rubber derived from latex to which coagulase has been added.

Signed at New York, county and State of New York, this 8th day of February, 1917.

EDWARD MARK SLOCUM.